United States Patent
Matsuzaki et al.

(10) Patent No.: US 7,916,945 B2
(45) Date of Patent: Mar. 29, 2011

(54) IMAGE PROCESSING DEVICE, IMAGE FORMING DEVICE, COMPUTER READABLE MEDIUM AND IMAGE PROCESSING METHOD

(75) Inventors: Yoshiki Matsuzaki, Ebina (JP); Shun Yashima, Ebina (JP); Toshiyuki Kazama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1030 days.

(21) Appl. No.: 11/730,456

(22) Filed: Apr. 2, 2007

(65) Prior Publication Data
US 2008/0075363 A1 Mar. 27, 2008

(30) Foreign Application Priority Data
Sep. 27, 2006 (JP) ................................ 2006-262911

(51) Int. Cl.
G06K 9/36 (2006.01)
(52) U.S. Cl. ....................... 382/173; 382/162
(58) Field of Classification Search .................. 382/162, 382/164, 173, 199
See application file for complete search history.

(56) References Cited

FOREIGN PATENT DOCUMENTS

| JP | 8-85236 | 4/1996 |
|----|---------|--------|
| JP | 2000-112206 | 4/2000 |
| JP | 2001-157041 | 6/2001 |
| JP | 2001-245156 | 9/2001 |
| JP | 2006-082411 | 3/2006 |

*Primary Examiner* — Duy M Dang
(74) *Attorney, Agent, or Firm* — Morgan, Lewis & Bockius LLP

(57) ABSTRACT

An image processing device includes; an image segmentation unit that divides an image information set into a plurality of image areas, the image information set forming a plurality of lines each constituted of colored pixels arrayed in a first direction, and the image information set expressing gradations forming an image as a number of the colored pixels existing in a predetermined image area; an image area shift unit that shifts the predetermined image area among the plurality of image areas in a second direction different from the first direction, relative to an image area substantially contiguous to the predetermined image area; and a pixel replacement unit that replaces the colored pixels forming part of each of the lines and existing within a predetermined distance range from the boundary, with at least one of the colored pixels intervening between the lines.

32 Claims, 12 Drawing Sheets

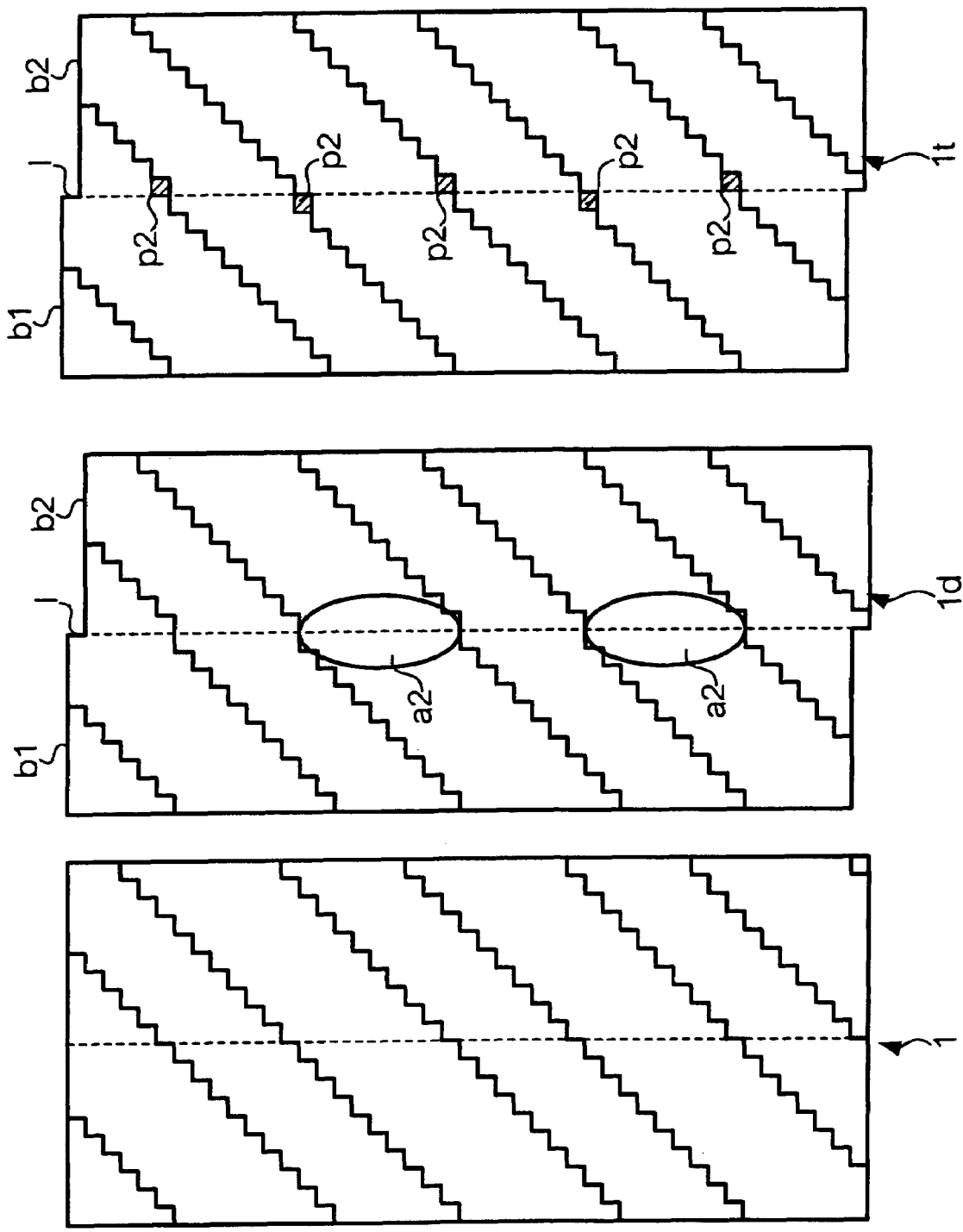

IMAGE PROCESSING DEVICE, IMAGE FORMING DEVICE, COMPUTER READABLE MEDIUM AND IMAGE PROCESSING METHOD

CROSS-REFERENCE TO RELATED APPLICATIONS

This application is based on and claims priority under 35 USC 119 from Japanese Patent Application No. 2006-262911 filed on Sep. 27, 2006.

BACKGROUND

1. Technical Field

The present invention relates to an image processing device, an image forming device, and a program.

2. Related Art

A common image forming device according to an electrophotographic system forms an image on an image carrier such as a photosensitive member, and then transfers the image to a recording material. At the time of transfer, positions of pixels which form the image and which are transferred to the recording material may be incorrectly transferred to positions that are dislocated from desired positions. To overcome this problem in the technical art, there have been proposed different methods for correcting dislocation of pixels by performing image processing directly on image data. In one example of such a method there is provided a coordinate system on which an image is positioned and relative to which the image is converted into another coordinate system, and adjusted by a correction amount to compensate for positional dislocation.

SUMMARY

According to an aspect of the present invention, there is provided an image processing device including: an image segmentation unit that divides an image information set into a plurality of image areas, the image information set forming a plurality of lines each constituted of colored pixels arrayed in a first direction, and the image information set expressing one or more gradations forming an image as a number of the colored pixels existing in a predetermined image area; an image area shift unit that shifts the predetermined among the plurality of image areas in a second direction different from the first direction, relative to an image area substantially contiguous to the predetermined image area; and a pixel replacement unit that replaces at least one of the colored pixels forming part of each of the lines and existing within a predetermined distance range from the boundary, with at least one of the colored pixels intervening between the lines, if each interval between the lines on a boundary between the predetermined image area and the substantially contiguous image area in the image after shifting the predetermined image area by the image area shift unit is narrower than each interval between the lines on a boundary between the predetermined image area and the substantially contiguous image area in the image before shifting the predetermined image area by the image area shift unit.

BRIEF DESCRIPTION OF THE DRAWINGS

The exemplary embodiment of the present invention will be described in detail based on the following figures, wherein:

FIG. 8 schematically shows how pixels are replaced to suppress occurrence of a defective image when correcting a skew;

DETAILED DESCRIPTION

An exemplary embodiment of the present invention will now be described below.

First, a principle basing suppression of formation of defective images will be described along with a configuration of the embodiment.

Figure 1:
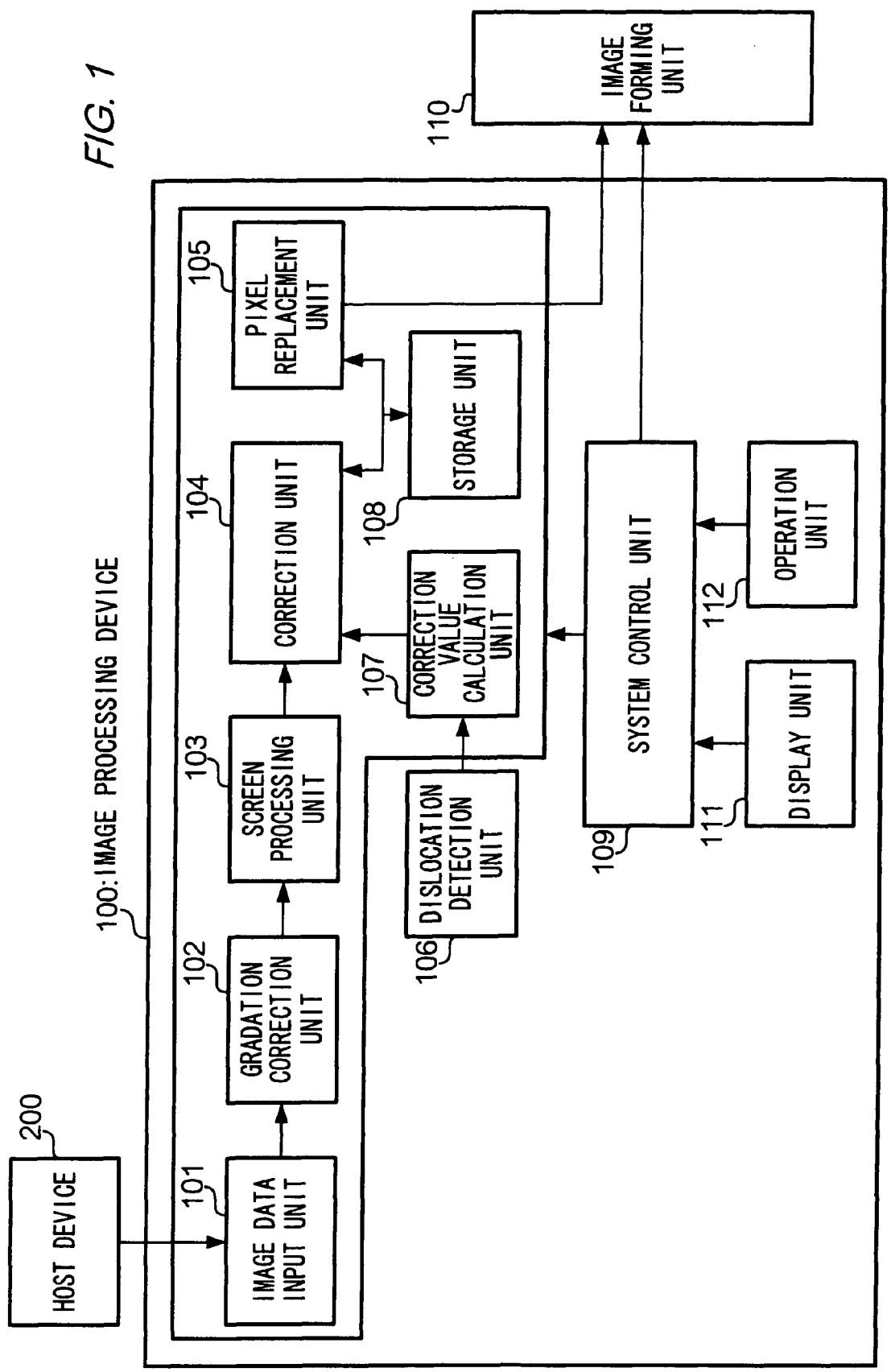
FIG. 1 shows a configuration of an image processing device according to an embodiment of the invention.

FIG. 1 shows a system configuration according to the embodiment. An image processing device 100 is built in, for example, an image forming device according to an electrophotographic system, such as a color printer or color copying machine. As shown in the figure, the image processing device 100 includes, an image data input unit 101, a gradation correction unit 102, a screen processing unit 103, a correction unit 104, a pixel replacement unit 105, a dislocation detection unit 106, a correction value calculation unit 107, a storage unit 108, a system control unit 109, a display unit 111, and an operation unit 112. Among these componential units, the image data input unit 101, gradation correction unit 102, screen processing unit 103, correction unit 104, pixel replacement unit 105, correction value calculation unit 106, storage unit 108, and system control unit 109 are constituted by various memories and control circuits, such as an ASIC (Application Specific Integrated Circuit), a CPU (Central Processing Unit), etc.

The image data input unit 101 has a communication circuit not shown and receives an image data (image information) transmitted via a network or a communication line from a host device 200 such as a personal computer. The image data input unit 101 inputs the image data to the image processing device 100. This image data is written in PDL (Page Description Language). The image data input unit 101 performs rasterization based on the image data and generates an image data set (hereinafter a bitmap data set) in a bitmap format at 600 dpi, for example. The term "dpi" is an abbreviation of "dots per inch" and indicates a number of pixels per inch (the term is used with the same meaning in the following description). The gradation correction unit 102 performs gradation correction, shading correction, and the like on the bitmap data set described above. The screen processing unit 103 performs screen processing on the bitmap data set subjected to gradation correction by the gradation correction unit 102. The screen processing is to convert multi-value data into binary data and to express gradations each as a number of pixels per a predetermined unit image area whereby the pixels are colored pixels expressed by the binary data. There are various types of screens such as a halftone type, a stripe type, etc. This embodiment is technically characterized in use of a stripe type screen.

FIGS. 2A to 2D illustrate an example of screen processing. The screen processing which uses a stripe type screen will now be described schematically with reference to these figures.

Figures 2A, 2B:
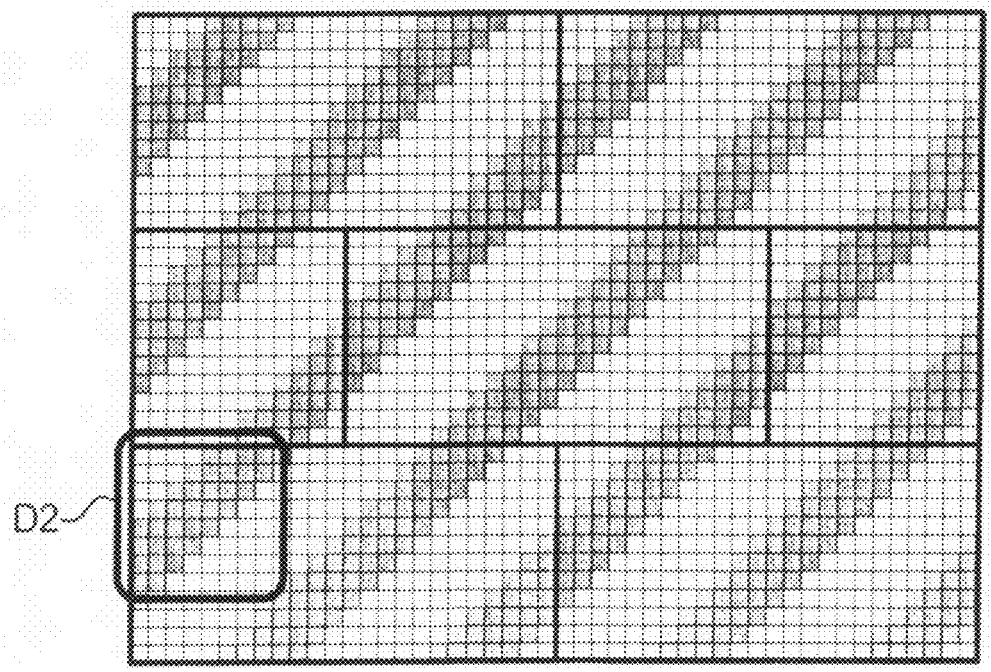
FIG. 2A illustrates screen processing.
FIG. 2B illustrates screen processing.

FIG. 2A shows a multi-value bitmap data set of 600 dpi. This bitmap data set is supplied to the screen processing unit 103 from the gradation correction unit 102. Each cell c shown in the figures denotes one pixel. The numerical value "120" in each cell c denotes a "120-th" gradation (level) where a total of "288" gradations are given. Therefore, in case of FIG. 2A, the gradation of the bitmap data set is regarded as being equivalent to 120/288=42%.

FIG. 2B shows a threshold matrix stored in the screen processing unit 103. The threshold matrix expresses a structure of a screen. More specifically, the threshold matrix is a set of thresholds for binarizing an image data set having multi-value density, according to specified output resolution. In this example, output resolution is set to 2400 dpi, and thresholds from "1" to "288" are arrayed on the threshold matrix according to a certain rule. The screen processing unit 103 compares, in units of pixels, data values in a data group D1 of the multi-value bitmap data set shown in FIG. 2A with thresholds (e.g., a threshold group D2) contained in the threshold matrix shown in FIG. 2B, for example. If a data value of the bitmap data set is equal to or higher than a compared threshold, a related pixel is set "ON". Otherwise, if a data value is lower than a compared threshold, a related pixel is set "OFF". Data values are binarized in this manner. Also in this example, resolution needs to be converted from 600 dpi to 2400 dpi. Therefore, binarization is carried out regarding a data value of each one pixel of 600 dpi as an equivalence to data values of 4×4=16 pixels of 2400 dpi. FIG. 2D shows a data group D4 which enlarges the data group D1 of the bitmap data set as well as a threshold group D5 which enlarges the threshold group D2.

Figure 2C:
FIG. 2C illustrates screen processing.
Figure 2D:
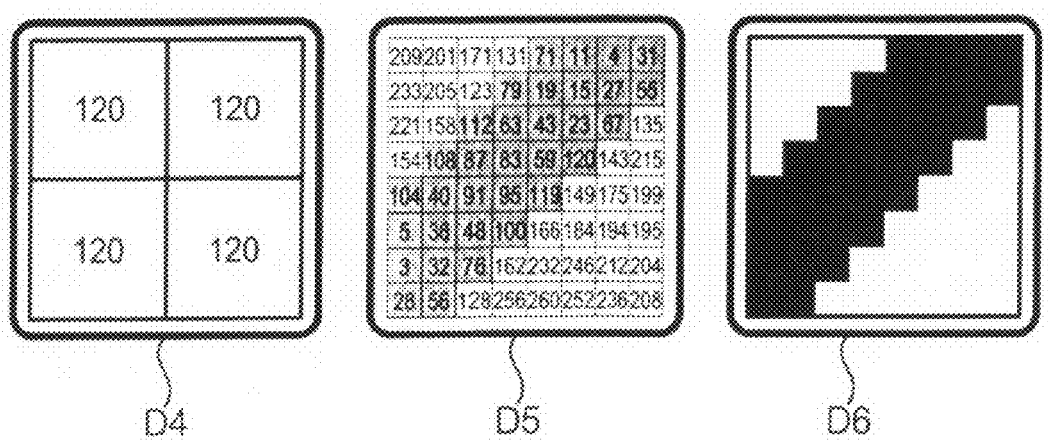
FIG. 2D illustrates screen processing.

Next, FIG. 2C shows the bitmap data set after binarization. In this figure, pixels each compared with a threshold and determined to be set "ON" are colored in black. Other pixels determined to be set "OFF" are colored in white. When paying attention to black pixels which are predetermined pixels in this embodiment, plural lines formed by arraying such black pixels extend in such a direction as to ascend closer to the main scanning direction as the lines extend (e.g., in a diagonally upward direction to the right in the figure). Thus, a gradation of a bitmap data set subjected to screen processing is expressed as the number of plural black pixels per unit image area that are arrayed continuously to each other extending in a certain direction (e.g., in the diagonally upward direction to the right as well in the figure). The image D6 shown in FIG. 2D is an enlarged view of the image area D3 in FIG. 2C.

In binary data, every image area which is set "ON" denotes existence of black pixels while every image area which is set "OFF" denotes no existence of black pixels. In other words, image areas which are set "OFF" do not include pixels. This embodiment, however, will be hereinafter described supposing that white pixels exist in every image area which is set "OFF", to help smooth understanding of the description.

Although black pixels are regarded as the predetermined pixels in the embodiment, white pixels can be dealt with as the predetermined pixels instead. When forming images for colors of Y (yellow), M (magenta), and C (cyan), white pixels can be regarded as the predetermined pixels or pixels in colors of Y (yellow), M (magenta), and C (cyan) can respectively be regarded as the predetermined pixels.

An outline of screen processing is as has been described above.

An image forming unit 110 shown in FIG. 1 forms an image on a recording material, depending on an image data set supplied from the image processing device 100.

Figure 3:
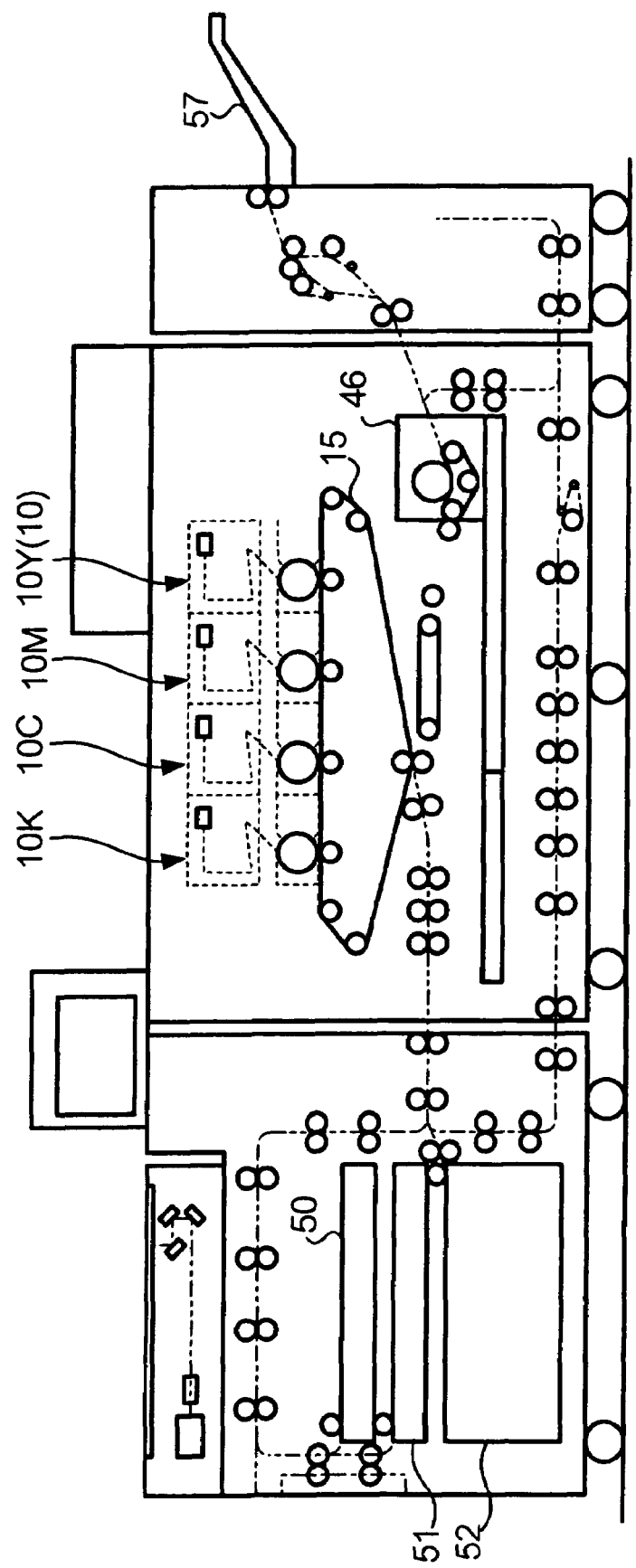
FIG. 3 is a sectional view showing a structure of an image forming unit.

FIG. 3 is a sectional view showing a structure of the image forming unit 110.

The image forming unit 110 has image forming engines 10C, 10M, 10Y, and 10K for C (cyan), M (magenta), Y (yellow), and K (black), respectively. These image forming engines 10C, 10M, 10Y, and 10K each include: a photosensitive drum as an image carrier member which carries an image; an electric charging device which uniformly electrifies the photosensitive drum to a predetermined electric potential; an exposure device which irradiates the photosensitive drum with light in accordance with image data for a related toner color, to form an electrostatic latent image; and a developing device which develops the electrostatic latent image by supplying toner of a related toner color to the electrostatic latent image, to form a toner image on the surface of the photosensitive drum. Toner images formed by the image forming engines 10C, 10M, 10Y, and 10K are transferred (by primary transfer) to an intermediate transfer belt 15 which is suspended over plural rolls to rotate the rolls. Further, the toner images are transferred (by secondary transfer) to a recording material that is provided, as required, from any of container trays 50, 51, and 52. A fixing device 46 is provided at the downstream side in the conveying direction of the recording material, relative to the positions of the image formation units 10C, 10M, 10Y, and 10K. The fixing device 46 fixes the toner images to the surface of the recording material by heating and pressing the recording material onto which the toner images have been transferred. Then, the recording material which has passed through the fixing process is ejected onto a sheet output tray 57.

The dislocation detection unit 106 shown in FIG. 1 is capable of reading any of the toner images formed on the photosensitive drums, the intermediate transfer belt 15, and the recording material, and detects positional dislocation of pixels forming the read image. For example, in a case of reading a toner image formed on the intermediate transfer belt 15, the dislocation detection unit 106 detects positional dislocation of pixels on a recording material on the basis of the position of an image sensed by an optical sensor. The dislocation detection unit 106 has the optical sensor provided near an outer circumferential face of the intermediate transfer belt in the image forming unit 110. More specifically, the image forming unit 110 forms pattern images at two or more different positions in the main scanning direction of the outer circumferential face of the intermediate transfer belt. The dislocation detection unit 106 reads these pattern images to determine an amount of position dislocation of pixels. It is to be noted that the terms "amount of positional dislocation" and "positional dislocation amount" are used herein to refer to an amount of positional dislocation in a main scanning direction and to refer to magnification of skew. The main scanning direction is a direction in which a light is moved and with which the exposure device in the image forming unit 110 irradiates (scans) the surface of an image carrier member. The sub scanning direction is a rotation direction (e.g., the moving direction of the surface of each photosensitive member) in the image forming unit 110. These main and sub scanning directions are perpendicular to each other.

Returning again to FIG. 1, the correction value calculation unit 107 obtains a correction approximate function on the basis of a dislocation amount detected by the dislocation detection unit 106, and calculates a correction value for correcting the positional dislocation of pixels. The correction unit 104 corrects the positional dislocation of pixels by performing image processing on the bitmap data set on the basis of the correction value. The pixel replacement unit 105 outputs the bitmap data set to the image forming unit 110 after performing pixel replacement, which will be described later, in order to suppress occurrence of a defective image from the bitmap data set in which the positional dislocation of pixels has been corrected. The image forming unit 110 forms an image on a recording material through the process described above based on the bitmap data set. The display unit 111 displays a variety of information and operation screens. The operation unit 112 receives various operations conducted by a user, and supplies the system control unit 109 with signals according to the operations. The system control unit 109 performs display control of the display unit 111 and also performs processing according to signals from the operation unit 112. Further, the system control unit 109 controls overall operation of the entire image processing device 100.

Figure 4:
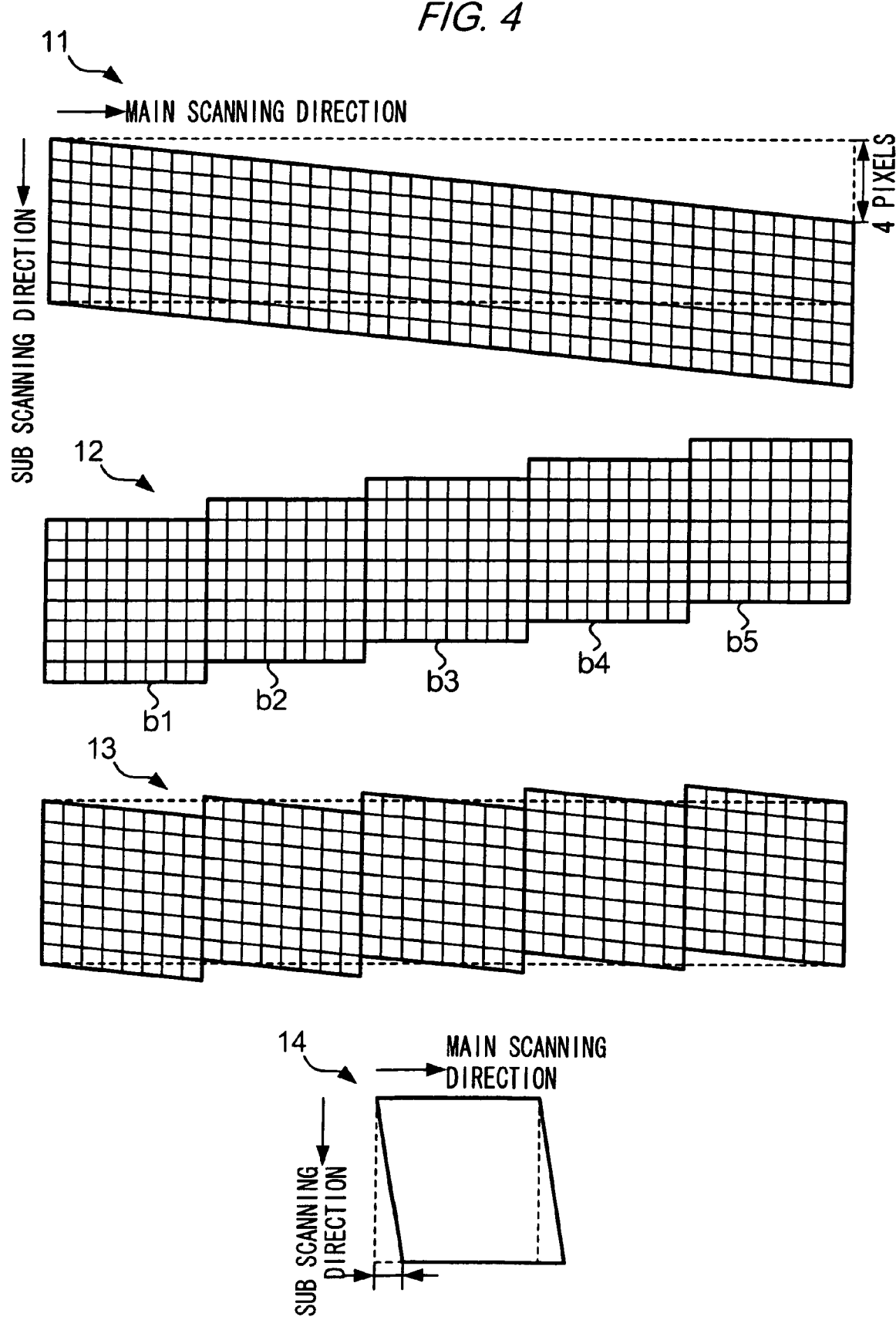
FIG. 4 schematically shows processing for correcting a skew.

FIG. 4 schematically illustrates in particular processing for correcting a skew among various kinds of positional dislocation of pixels.

FIG. 4 assumes a case that a downward skew to the right occurs in four pixels in an image 11 formed on a recording material. The expression "downward skew to the right" here refers to a shear deformation of an image. For example, along the main scanning direction (to the right in the figure), an upper or lower edge of the image gradually moves away in the sub scanning direction (to the lower side in the figure) from an ideal upper or lower edge of the image as indicated by a broken line in the figure. Inversely, there is an upward skew to the right. That is, along the main scanning direction (to the right in the figure), an upper or lower edge of the image gradually moves away in a direction (to the upper side in the figure) opposite to the sub scanning direction from an ideal upper or lower edge of the image as indicated by the broken line in the figure.

In case of a downward skew to the right, skew correction processing need only transform the image data set to skew it up by a distance equivalent to a required number of pixels. More specifically, the image 11 is divided evenly by a certain width (8 pixels in the figure) along the main scanning direction, into five image areas b1, b2, b3, b4, and b5. Further, positions of the image areas b2, b3, b4, and b5 are shifted up (in a direction opposite to the sub scanning direction) in the figure by one pixel for each image area along the main scanning direction. Thus, an image data set 12 is generated. If an image is formed on a recording material on the basis of such an image data set 12, the downward skew to the right occurring in the image 11 can be canceled as illustrated in an image 13. As illustrated by the image data set 12 in FIG. 4, moving up (in the opposite direction to the sub scanning direction) of the positions of the image areas by one pixel per image area along the main scanning direction is hereinafter referred to as "shift up". On the contrary to the image data set 12 in FIG. 4, image areas need only to be shifted down (in the sub scanning direction) by one pixel per image area along the main scanning direction, with respect to an upward skew to the right. This processing is called "shift down."

Also, the image 11 in FIG. 4 shows a case that positions of pixels are dislocated in the sub scanning direction. However, there is another case that a skew causes positional dislocation of pixels in the main scanning direction as illustrated by the image 14. In the latter case, the main scanning direction can be regarded as a vertical direction (upward or downward) while the sub scanning direction is regarded as a horizontal direction (to the left or right). Then, the skew can be corrected by shift up or down as applied to the image 13.

Figure 5:
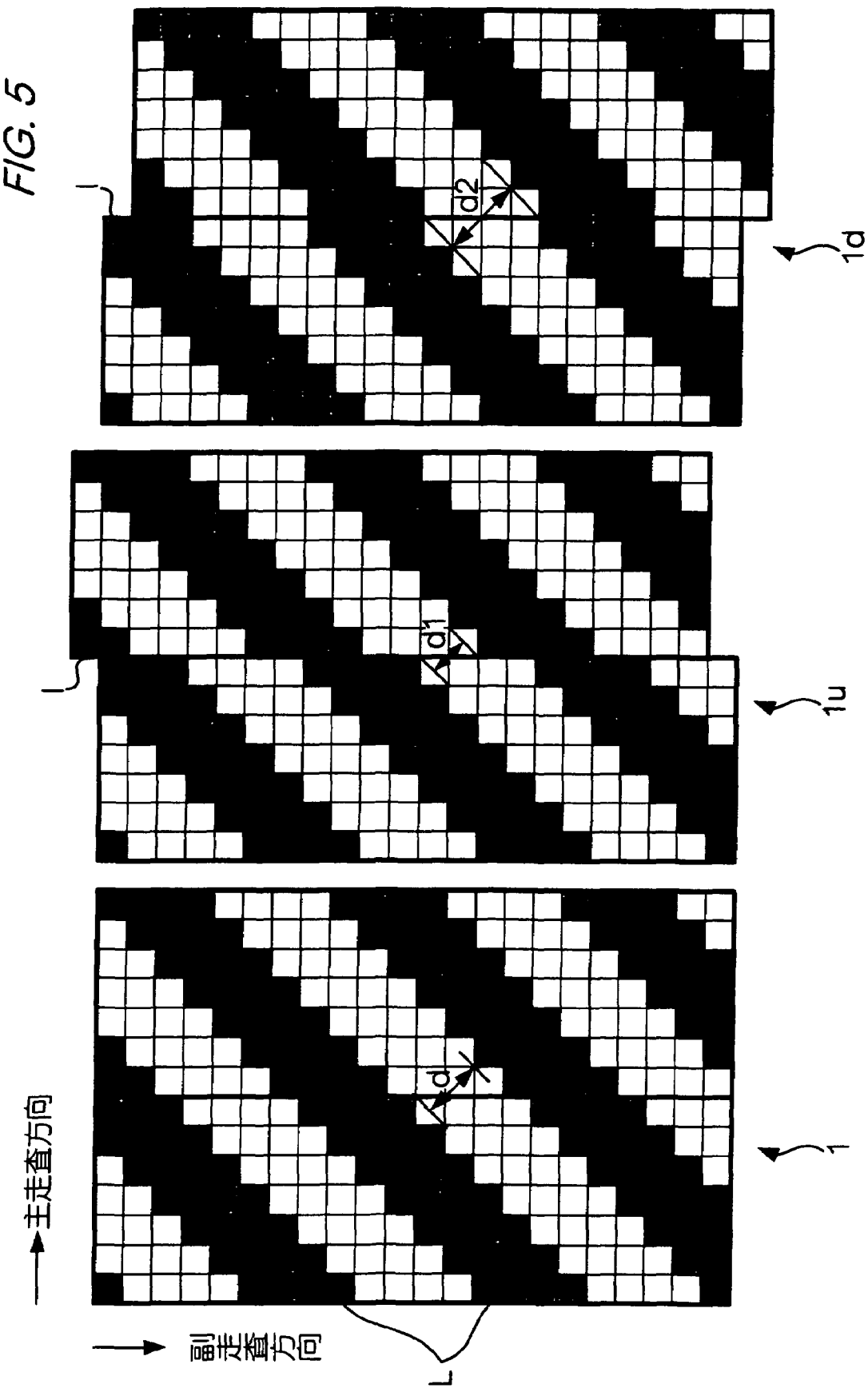
FIG. 5 schematically shows how a defective image occurs when correcting a skew.

Next, FIG. 5 shows a state in which correction to a skew as described above involves a defective image.

In an image 1 in FIG. 5, a large number of micro lines L are formed by the screen processing described with reference to FIG. 2. Each of the lines is formed of black pixels arrayed continuously in a direction at an angle of 45° to both the main and sub scanning directions. Further, on a white background, a gray-tone gradation is expressed by the number of black pixels per unit image area among the plural black pixels forming the lines. If shift up is performed on this image 1 to correct a skew, pixels are arrayed as illustrated in an image 1u. When observing a distance between lines L near a boundary 1 between image areas at this time, a distance d1 between the lines L after shift up is shorter than the distance d between the lines L before shift up. That is, near the boundary 1 after shift up, black pixels are more densely distributed than before the shift up. As a result, there is formed a defective image containing parts having a density that is higher than an intended density, at parts near ends of the lines at the boundary 1 between image areas. Such parts of a defective image often have the appearance of a black band in the image and will hence be referred to as a "black band" hereinafter in this embodiment. The color of this defective image depends on the color of pixels forming the lines L, In FIG. 5, pixels forming the lines L are black, and therefore, a "black" band appears. However, if pixels forming the lines L are of any of colors ordinarily used in image forming devices, such as yellow, magenta, and cyan, there is formed a defective image of a corresponding color to the color of pixels forming the lines L.

On the contrary, if shift down is performed on the image 1 to correct a skew, the pixels are arrayed as shown in an image 1d. Where attention is paid to a distance between lines L near a boundary 1 between image areas at this time, a distance d2 between the lines L after shift down is longer than the distance d between the lines L before the shift down. That is, near the boundary 1 after shift down, white pixels are more densely distributed than before the shift down. As a result, a defective image appear containing parts having a density that is lower than an intended density, at parts near ends of the lines at the boundary 1 between image areas. Such parts of a defective image tend to have the appearance of a white band in the image, and will hence be referred to as a "white band", for convenience, in this embodiment.

The inventors conducted extensive experiments and determined specific conditions that tend to induce a banded defective image as described above. The conditions are as stated below.

(i) A screen of a stripe type is used, and lines forming the screen extend in a direction at an angle 45° to both the main scanning direction and sub scanning direction (a defective image is formed more easily as the line extending angle is closer to 45°).

(ii) The lines have a concentration of 200 to 300 lpi (line per inch) where the concentration is defined as the number of lines per inch of width along a direction perpendicular to the lines.

(iii) Image density (gradation) is within a range of 20 to 60%.

Figure 6:
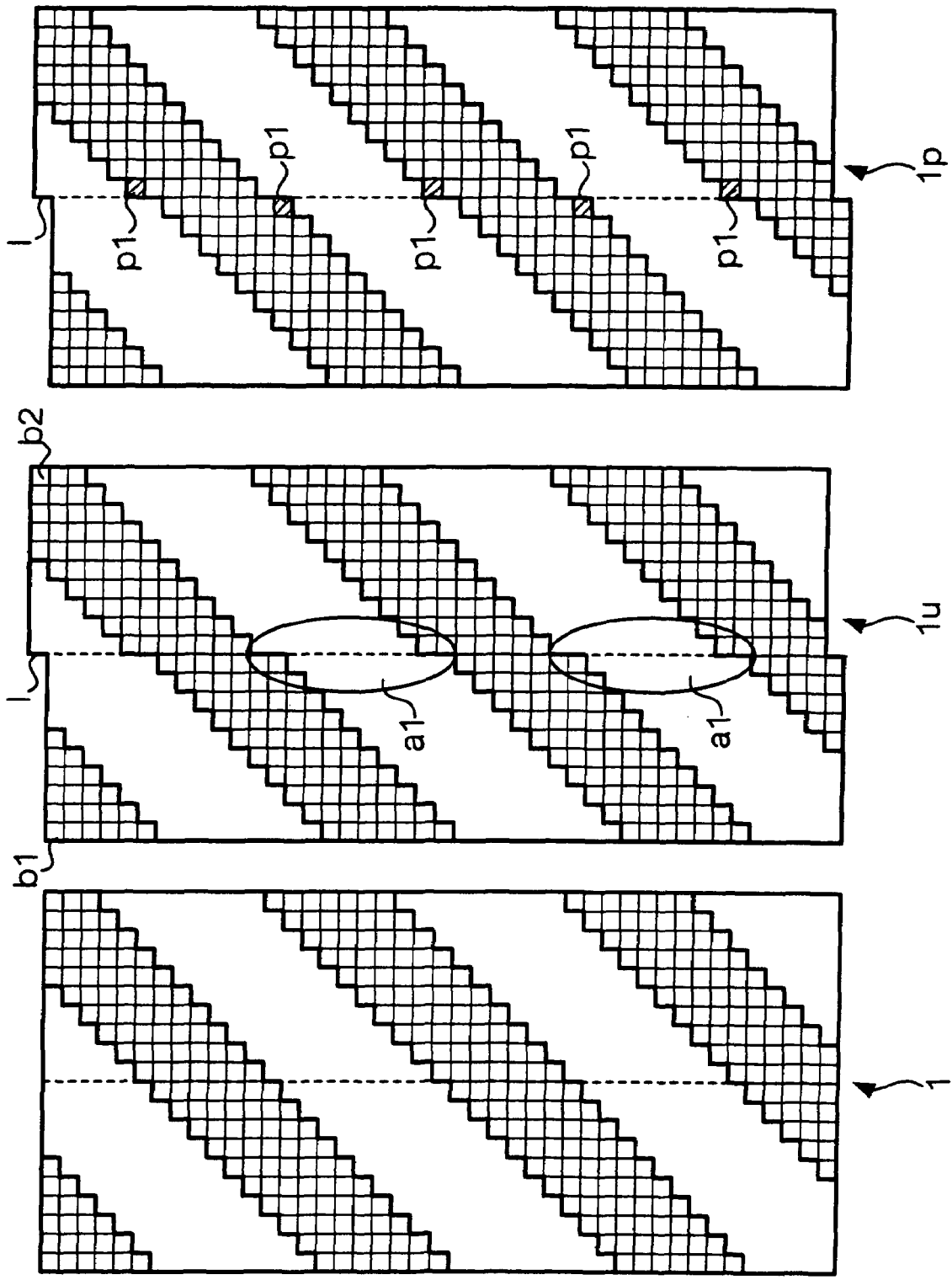
FIG. 6 schematically shows how pixels are replaced to suppress occurrence of a defective image when correcting a skew.

The inventors attempted various improvements of image quality on defective images created under such conditions. As a conclusion, replacement processing of pixels as described above were effective for reduction of defective images. Hereinafter, this pixel replacement processing will be described in more detail. An image 1 in FIG. 6 is an image which has been subjected to stripe type screen processing in a direction at an angle 45° to both the main and sub scanning directions. If shift up is performed on the image 1 to correct a downward skew to the right, pixels are arrayed as illustrated in an image 1*u*. In this state, a black band appears as described previously. Then, black pixels as pixels p1 located at positions of hatched pixels in an image 1*p* are replaced with white pixels.

The reason is as stated below.

In the image 1*u* subjected to shift up, an image area a1 including more black pixels than other image areas appears near a boundary 1 between image areas b1 and b2. This image area a1 causes a black band. However, even in an image area where black pixels are distributed more densely after shift up, a balance between black and white pixels after the shift up can recover a balance before the shift up by replacing any of black pixels included in this image area with a white pixel.

In this case, several pixel positions are suitable as positions of pixels as targets to be replaced.

Figure 7:
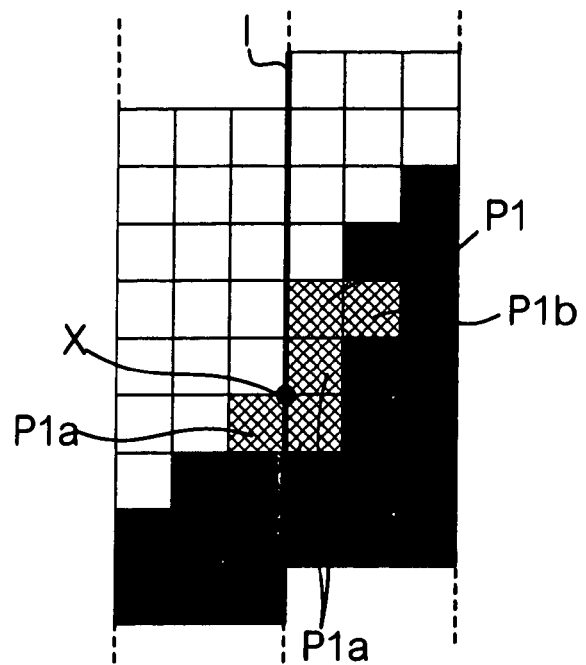
FIG. 7 shows an example of positions of pixels as target to be replaced.

For example, as shown in FIG. 6, black pixels positioned in contact with the boundary 1 and an end of a line L can suitably be replaced with white pixels. In this case, the term "end" refers to a position of an interface where pixels forming a line contact with pixels not forming a line. Alternatively, as denoted by pixels P1*a* in an enlarged view of FIG. 7, black pixels positioned in contact with an intersection X between the boundary 1 and a line L (or an end thereof) can be replaced with white pixels. Also alternatively, as denoted by a pixel P1*b* shown in FIG. 7, a black pixel at a position (not in contact with the boundary 1) shifted by one pixel in a direction extending away from the pixel P1 can be replaced with a white pixel.

From experiments, it was confirmed that a constant effect occurred if a black pixel existing near both the boundary 1 and an end of a line L is set as a target to be replaced. The positions of pixels shown in FIGS. 6 and 7 as targets to be replaced are mere examples. Positions of target pixels to be replaced can be appropriately changed, taking into consideration influences exerted on images due to replacement of pixels, a direction of extension of lines, a concentration of lines, an image density, and so on. In any case, at least one of black pixels contained in a range of a predetermined distance from the boundary 1 between mutually contiguous image areas needs to be replaced with a white pixel. The predetermined distance is equivalent to, for example, several pixels.

Next referring to FIG. 8, pixel replacement in case of shift down will now be described.

Image 1 shows stripe type screen processing effected in a direction at an angle of 45° to both the main and sub scanning directions. If shift down is performed on the image 1 to correct an upward skew to the right, the pixels are arrayed as shown in an image 1*d*. A white band appears in this state. Hence, pixels P2 which are white pixels, as denoted by hatched pixels in an image 1*t*, are replaced with black pixels.

This replacement is carried out for the reason stated below.

In the image 1*d* subjected to shift down, a large number of image areas a2, each of which include a greater number of white pixels than other image areas, exist near the boundary 1 between image areas b1 and b2, and these image areas a2 cause a white band. However, even in such image areas where white pixels are distributed more densely after shift down, a balance between white and black pixels after the shift down can be recovered before the shift down by replacing white pixels included in each of those image areas with black pixels.

In this case as well, several pixel positions are suitable as positions for pixels as targets to be replaced.

Figure 9:
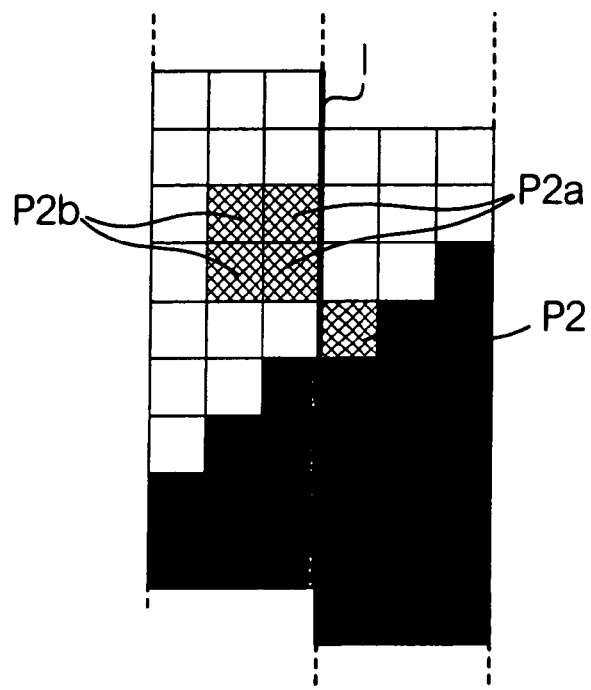
FIG. 9 shows an example of positions of pixels as target to be replaced.

For example, as shown in FIG. 8, white pixels positioned in contact with the boundary 1 and an end of a line L can suitably be replaced with black pixels. Alternatively, as denoted by pixels P2*a* in an enlarged view of FIG. 9, black pixels positioned in contact with the boundary 1 can be replaced with white pixels. Also alternatively, as denoted by pixels P2*b* shown in FIG. 9, black pixels at positions (not in contact with the boundary 1) shifted by one pixel in an opposite direction to the boundary 1 can be replaced with white pixels. Through experiments, a constant effect was confirmed to occur if a pixel existing near both the boundary 1 and an end of a line L is a target to be replaced. The positions of pixels shown in FIGS. 8 and 9 as targets to be replaced are mere examples. Positions of target pixels to be replaced can be appropriately changed, as described previously, taking into consideration an influence exerted on images from replacement of pixels, the direction of extension of lines, concentration of lines or image density, and so on. In any of these cases, at least one of white pixels contained within a range of a predetermined distance (equivalent to, for example, several pixels) from the boundary 1 between mutually contiguous image areas needs to be replaced with a black pixel.

Figure 10:
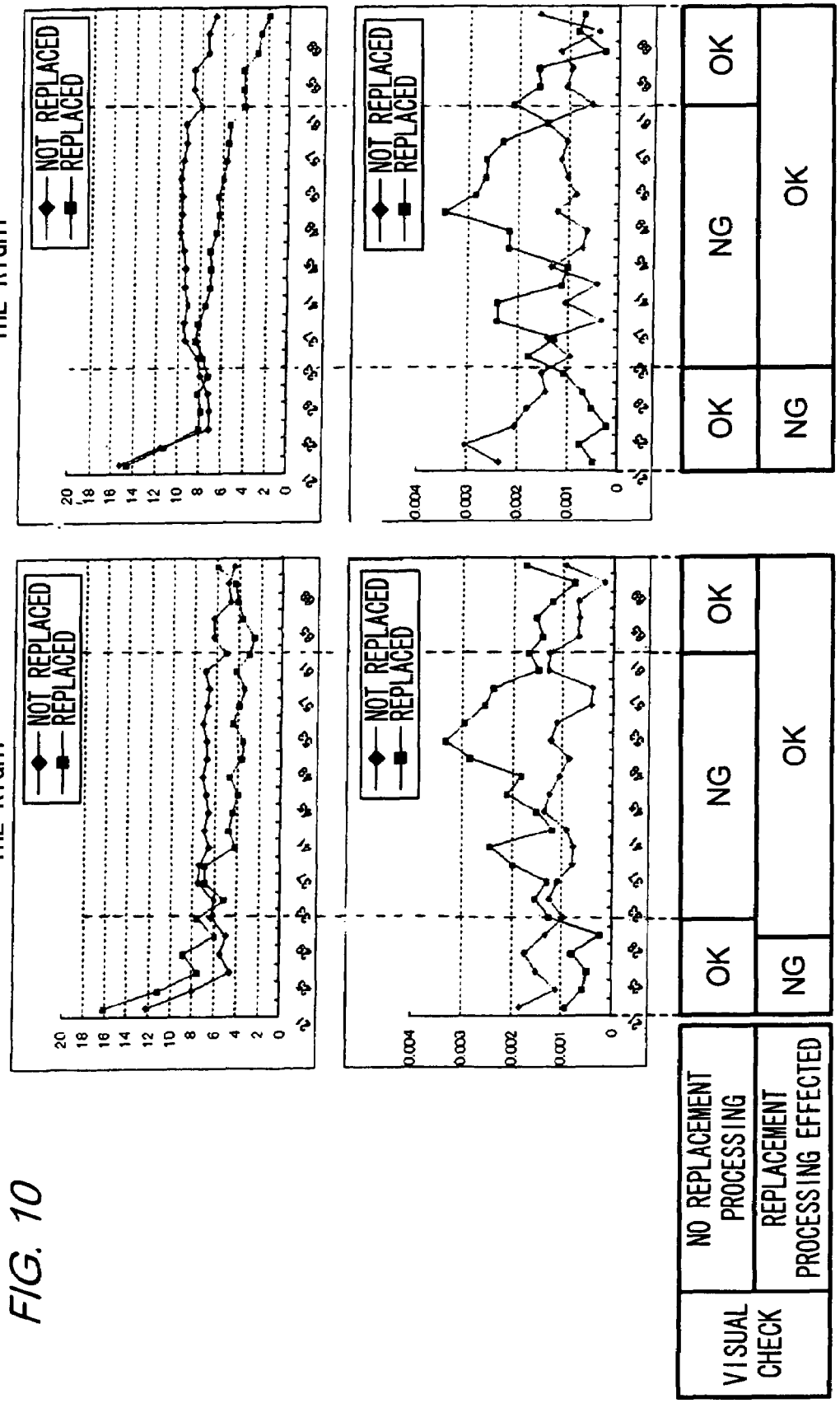
FIG. 10 shows graphs of experimental results which substantiate effects of pixel replacement.

Next, FIG. 10 shows an experimental result showing how much the pixel replacement described above could suppress occurrences of defective images.

Graphs in the left side in FIG. 10 show occurrence frequencies of defective images where an upward skew to the right was corrected. The upper graph shows results of calculative simulations. The lower graph shows results of reading an image actually formed on a recording material and analyzing the read image by FFT (Fast Fourier Transform). Further, labels at the bottom of the figure indicate occurrence levels of defective images where a tester visually checked the results. "OK" indicates that defective images were not conspicuous. "NG" indicates that defective images were conspicuous.

In the upper graph, a line connecting diamond vertices represents a relationship between gradations (horizontal axis) of an image and intensity (vertical axis) of a defective image where pixel replacement as described above was not carried out. On the other side, another line connecting square vertices represents a relationship between gradations (horizontal axis) of the image and intensity (vertical axis) of a defective image where the pixel replacement was carried out. Also, in the lower graph a line connecting diamond vertices represents a relationship between gradations (horizontal axis) of an image and intensity (vertical axis) of a defective image where the pixel replacement was not carried out. Another sequential line connecting square vertices represents a relationship between gradations (horizontal axis) of the image and intensity (vertical axis) of a defective image where the pixel replacement was carried out. In both graphs, the "intensity of a defective image" on the vertical axis is expressed as a numerical value obtained by converting strength of a defective image (conspicuousness) into a numerical value according to a predetermined standard.

As is apparent from comparison between lines of diamond and square vertices in both the upper and lower graphs, defective images appeared with relatively strong intensity within a gradation range of 30 to 60% unless pixel replacement was carried out. In contrast, when pixel replacement was carried out, occurrence of defective images was suppressed to be in the same gradation range as 30 to 60%. When the gradation exceeds 60%, defective images did not appear more intensively even if pixel replacement was not carried out.

On the other side, within another gradation range of approximately 20 to 30%, the intensity of a defective image was rather stronger. Thus, defective images were made conspicuous rather than suppressed when pixel replacement was carried out with respect to a relatively low gradation. This phenomenon was observed also in the case of correcting a downward skew to the right in the figure. A reason for this phenomenon can be considered to be that the original image had low gradations. If pixel replacement is carried out to change pixel colors from an original image which has low gradations, influence of the change of colors appears intensively and thus tends to emphasize a defective image rather than suppress it. In other words, pixels were replaced excessively.

Figure 11:
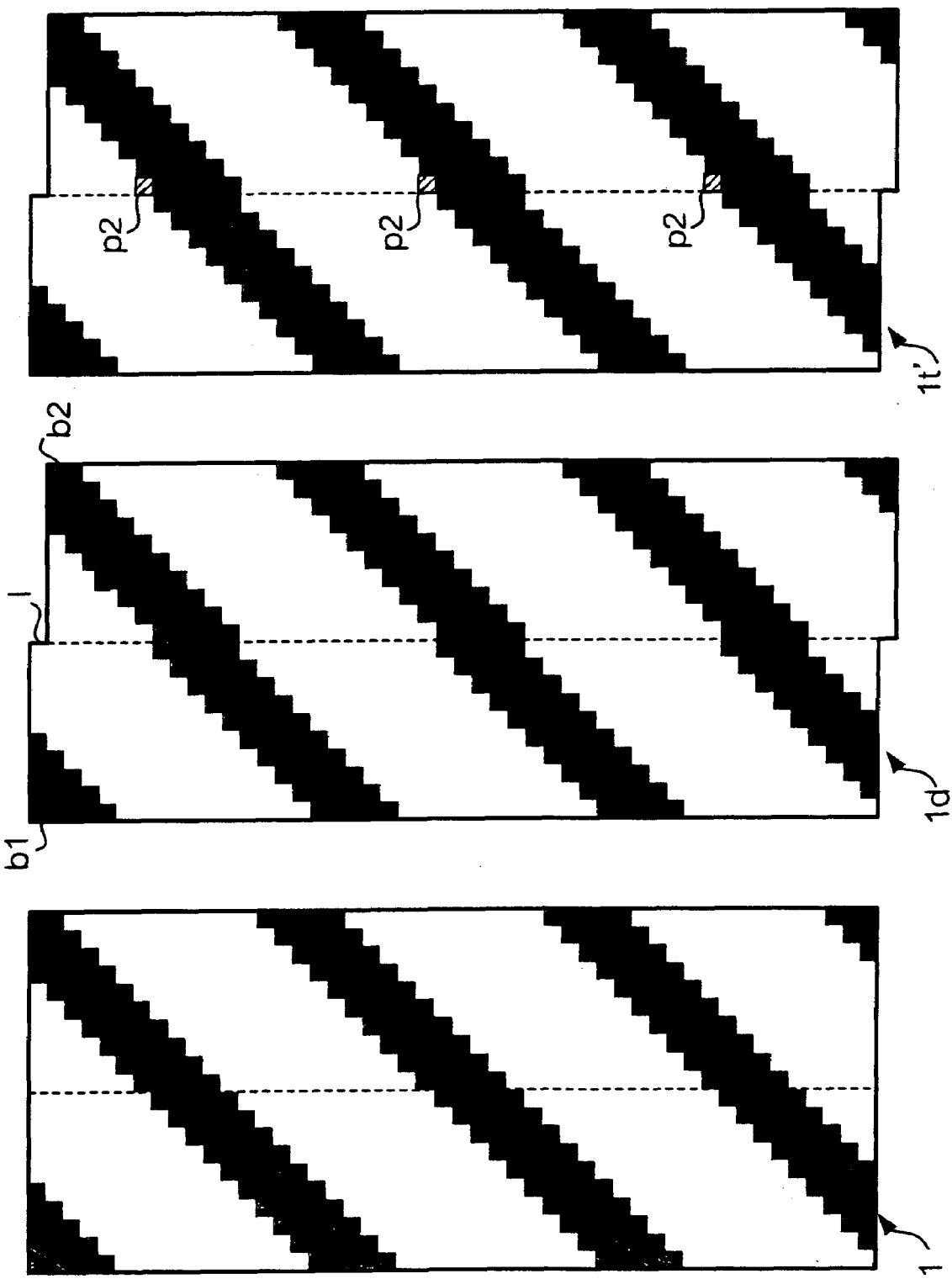
FIG. 11 schematically shows how pixels are replaced to suppress occurrence of a defective image in a low gradation range.

In this embodiment, however, the content of processing in the pixel replacement differs between low and high gradation ranges. More specifically, in a low gradation range (for example, gradations of about 30 to 40%) as shown in FIG. 11, a smaller number of pixels to be replaced are reduced than in a high gradation range (for example, gradations of about 40 to 60%) as shown in FIG. 8. That is, in the high gradation range, white pixels in two sides of the boundary 1 between image areas b1 and b2 were replaced with black pixels, as described with reference to FIG. 8. In FIG. 11, white pixels only in one side of the boundary 1 are replaced with black pixels. In other words, if a gradation of an image exceeds a first threshold (any value within a range of 30 to 40% in this case), pixel replacement is carried out. If the gradation further exceeds a second threshold (any value within a range of 40 to 50% in this case) higher than the first threshold, pixel replacement processing is carried out with respect to a greater number of pixels than the number of pixels replaced in case where the first threshold is exceeded.

Figure 12:
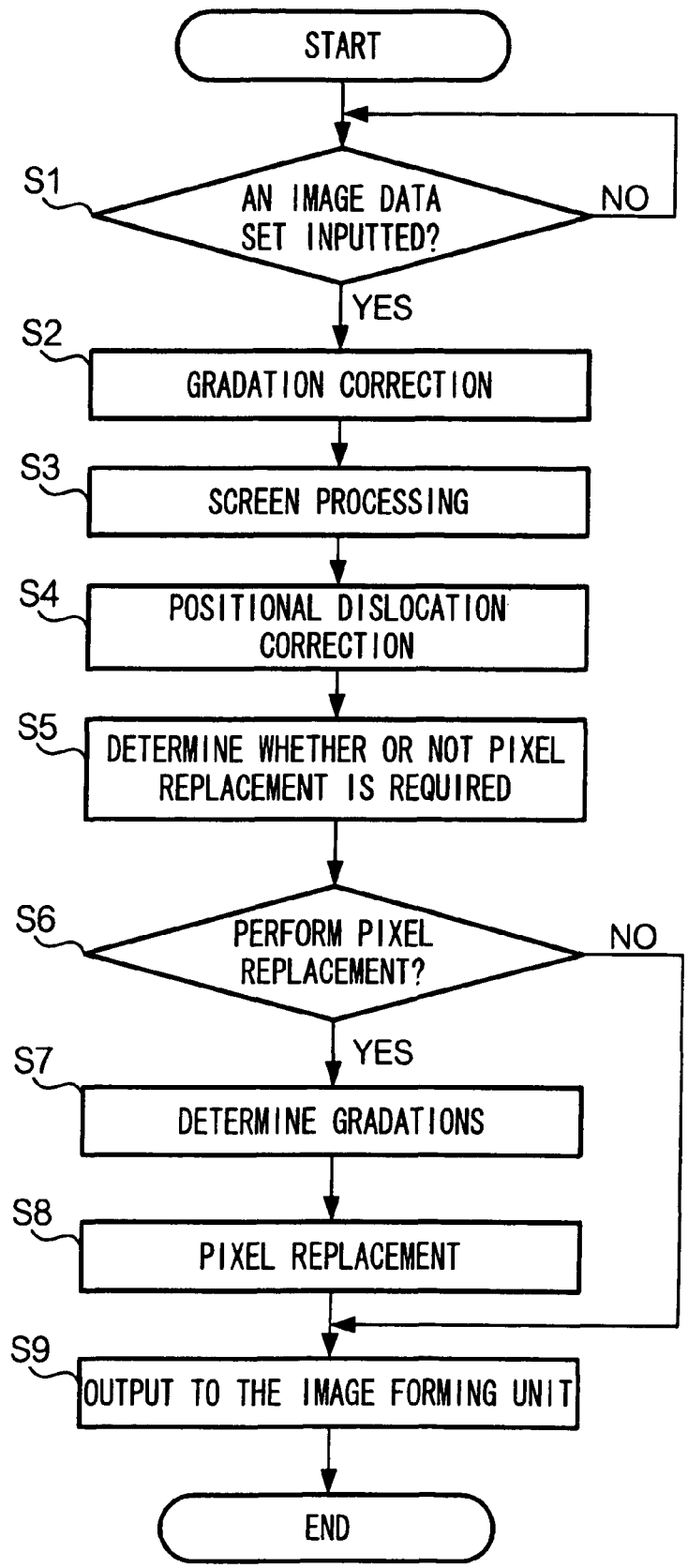
FIG. 12 is a flowchart showing operation of the embodiment.

Next, operation of the image processing device 100 is described with reference to a flowchart shown in FIG. 12.

First, an image data set is inputted to the image data set input unit 101 from the host device 200 (Step S1: Yes). The image data set input unit 101 then converts the image data set into image data having a bitmap format (a bitmap data set) and supplies an obtained bitmap data set to the gradation correction unit 102. The gradation correction unit 102 performs gradation correction, shading correction, and the like on the bitmap data set, and supplies the corrected bitmap data set to the screen processing unit 103 (Step S2). The screen processing unit 103 performs screen processing on the bitmap data set subjected to gradation processing as described above, and then supplies the bitmap data set to the correction unit 104 (Step S3). The correction unit 104 spreads the bitmap data set in the storage unit 108, and corrects positional dislocation of pixels on the basis of a correction value which has already been calculated by the correction value calculation unit 107 (Step S4).

Next, the pixel replacement unit 105 determines whether or not pixel replacement processing is required based on the bitmap data set stored in the storage unit 108 and attributes of the screen processing performed by the screen processing unit 103 (Step S5). As described previously concerning the conditions (i) to (iii), whether or not a defective image occurs is strongly related to attributes of a screen and gradations of an image. A defective image tends to occur easily if the three conditions are satisfied as follows. First, the screen is of a stripe type as shown in FIG. 2C which is formed of lines extending in a direction at an angle closer to 45° to the main and sub scanning directions (within an angular range of 45°±10° in this case). Second, the concentration of the lines is 200 to 300 lpi (line/inch). Third, the image has a gradation of 20 to 60%. The pixel replacement unit 105 determines whether or not pixel replacement processing is required depending on whether attributes of a bitmap data set and screen processing satisfy these conditions. If pixel replacement is performed when a defective image occurs at low intensity, such pixel replacement tends to emphasize a defective image rather than suppress the defect in the image through the pixel replacement in a low gradation range, as described previously.

If the pixel replacement unit 105 determines that pixel replacement processing is required (Step S6: Yes), a gradation range of the bitmap data set is determined (Step S7). That is, whether the gradation belongs to a low gradation range (20 to 40%) or a high gradation range (40 to 60%) is determined. Further, the pixel replacement unit 105 performs the pixel replacement processing described above on a number of pixels corresponding to the determined gradation range (Step S8). Further, the pixel replacement unit 105 outputs the bitmap data set subjected to the pixel replacement processing to the image forming unit 110 (Step S9). The image forming unit 110 forms an image on a recording material through the process described above on the basis of the outputted data.

The embodiment as has been described above can substantially be modified as follows.

The embodiment has been described with reference to an image processing device which suppresses defective images of both the black and white bands. However, modification can be made so as to suppress defective images of either or both of black and white bands, so as to accommodate a variety of situations. Namely, in some situations, white bands may appear inconspicuous and can thus be left as they are, while black bands may appear substantially conspicuous; while in other situations, white bands may appear substantially conspicuous while black bands are inconspicuous.

Further in the embodiment described above, if each interval between plural lines L at the boundary 1 between contiguous image areas becomes narrower after shifting (up or down) respective image areas, pixels constituting the lines L are replaced with pixels existing between the plural lines L. On the other side, if each interval between plural lines L at the boundary 1 between contiguous image areas becomes wider after shifting (up or down) respective image areas, pixels existing between the plural lines L are replaced with the pixels constituting the lines L. In brief, replacement processings as described above each aim at replacement of pixels constituting lines L with pixels intervening between the lines L in order that intervals between the lines L at the boundary 1 between contiguous image areas remain the same before and after shifting (up or down) the image areas. That is, a factor which causes a defective image is a change in intervals between lines that results from a correction made to resolve positional dislocation of pixels. In order to eliminate this factor, pixels need only be replaced such that intervals between the lines L at the boundary 1 remain the same before and after a shift of image areas. However, the intervals need not be exactly the same before and after a shift, and pixel replacement can be carried out so as to approximate the intervals as close as possible between before and after a shift.

Also the above embodiment refers to an example of skew correction to positional dislocation in the sub scanning direction as illustrated in the image 11 in FIG. 4. However, the same technique as described in the embodiment can be applied even to skew correction to positional dislocation in a main scanning direction as illustrated in the image 14 in FIG. 4. Further, in the embodiment the "main scanning direction"

and the "sub scanning direction" are regarded as reference axes in a plane-coordinates system. However, reference axes are not limited to these directions and can be of any type of two different axes on a plane. In a case of correcting positional dislocation of pixels, the correction unit 104 needs only to shift each of divided image areas along one of such two reference axes. This shifting direction of the image areas is supposed to be a second direction, and an extending direction of lines L of a screen is supposed to be a first direction. Then, the first and second directions satisfy a relationship of being not parallel to each other if a defective image appears. This is because intervals between lines L as described above do not change if the first and second directions are parallel to each other.

The embodiment requires, as a condition for pixel replacement, that an angle between an extending direction of lines L should fall within a range of 45°±10° to both the main and sub scanning directions. The condition is not limited to this range, and the angular range can be substantially narrow or wider. In conclusion, the pixel replacement unit 105 needs only to execute pixel replacement processing depending on the first direction (the shifting direction of image areas) and the second direction (the extending direction of lines L) as described above.

If a gradation of an image satisfies a condition that an image should have a gradation of 20 to 60%, pixel replacement processing is carried out. However, even if an image has a gradation exceeding 60%, pixel replacement can be carried out. In this case, however, the number of pixels to be replaced is smaller than the number of pixels to be replaced in case of an image having a gradation of 20 to 60%. That is, if a gradation exceeds a third threshold (supposing any value between 60 and 70% in this case), a smaller number of pixels than the number of pixels replaced in case of exceeding the first threshold are replaced, and pixel replacement is inhibited.

Also, the embodiment employs a two-stage processing structure, i.e., different numbers of pixels are to be replaced respectively for a gradation range of 20 to 40% and for another gradation range of 40 to 60%. However, gradations can be divided into three or more gradation ranges, and the processing can be carried out through three or more processing stages. Regardless of whether two or three or more gradation ranges are adopted, pixel replacement as described above is carried out. If an image has a gradation exceeding the second threshold higher than the first threshold, a greater number of pixels are replaced than the number of pixels replaced in a case of exceeding the first threshold. Thus, the configuration does not substantially change. In brief, the pixel replacement unit 105 needs only to replace pixels on the basis of gradations of an image.

While the embodiment is directed to the correction of skew, techniques described in the above embodiment are effective not only for skew correction but also for warp correction, linearity correction, and so on.

A system to be employed in the image forming unit 110 is not particularly limited as far as the system functions to form an image based on an image data set in which positional dislocation of pixels has been corrected by image processing. A method for detecting positional dislocation of pixels can be as follows. The image forming unit 110 outputs a test pattern to outside of the image processing device 100, and a dislocation amount determined through measurement by an external device can be inputted to the image processing device 100. In this case, the dislocation detection unit 106 need not be provided in the image processing device 100.

The image processing device 100 shown in FIG. 1 can be constituted by a computer built in an image forming device or by a host device (such as a personal computer) of an image forming device. Further, the processing procedure shown in FIG. 12 can be written as a program. The program can be recorded on a recording medium readable from a computer, such as a magnetic recording medium, optical recording medium, or ROM. In form of such a recording medium, the program can be supplied for the image processing device 100. Alternatively, the program can be downloaded to the image processing device 100 via a network such as the Internet.

What is claimed is:

1. An image processing device comprising:
   an image segmentation unit that divides an image information set into a plurality of image areas, the image information set forming a plurality of lines each constituted of colored pixels arrayed in a first direction, and the image information set expressing one or more gradations forming an image as a number of the colored pixels existing in a predetermined image area;
   an image area shift unit that shifts the predetermined image area among the plurality of image areas in a second direction different from the first direction, relative to an image area substantially contiguous to the predetermined image area; and
   a pixel replacement unit that replaces at least one the colored pixels forming part of each of the lines and existing within a predetermined distance range from the boundary, with at least one of the colored pixels intervening between the lines, if each interval between the lines on a boundary between the predetermined image area and the substantially contiguous image area in the image after shifting the predetermined image area by the image area shift unit is narrower than each interval between the lines on a boundary between the predetermined image area and the contiguous image area in the image before shifting the predetermined image area by the image area shift unit.

2. An image processing device comprising:
   an image segmentation unit that divides an image information set into a plurality of image areas, the image information set forming a plurality of lines each constituted of colored pixels arrayed in a first direction, and the image information set expressing one or more gradations forming an image each as a number of the colored pixels existing in a predetermined image area;
   an image area shift unit that shifts the predetermined image area among the plurality of image areas in a second direction different from the first direction, relative to an image area substantially contiguous to the predetermined image area; and
   a pixel replacement unit that replaces at least one of the colored pixels intervening between the lines and existing within a predetermined distance range from the boundary, with at least one of the colored pixels forming part of the lines between the lines, if each interval between the lines on a boundary between the predetermined image area and the substantially contiguous image area in the image after shifting the predetermined image area by the image area shift unit is wider than each interval between the lines on a boundary between the predetermined image area, and the substantially contiguous image area in the image before shifting the predetermined image area by the image area shift unit.

3. An image processing device comprising:
   an image segmentation unit that divides an image information set into a plurality of image areas, the image information set forming a plurality of lines each constituted of colored pixels arrayed in a first direction, and the image information set expressing one or more gradations forming an image as a number of the colored pixels existing in a predetermined image area;

an image area shift unit that shifts the predetermined image area among the plurality of image areas in a second direction different from the first direction, relative to an image area substantially contiguous to the predetermined image area; and a pixel replacement unit that replaces at least one colored pixel forming part of each of the lines with at least one colored pixel intervening between the lines, so as to equalize each interval between the lines on a boundary between the predetermined image area and the substantially contiguous image area in the image before and after shifting the predetermined image area by the image area shift unit.

4. The image processing device according to claim 1, wherein the at least one colored pixel forming part of each of the lines, which is to be replaced by the pixel replacement unit, is substantially in contact with a position and an end of one of the lines, the position being where the boundary between the predetermined and contiguous image areas intersect the lines.

5. The image processing device according to claim 2, wherein the at least one colored pixel forming part of each of the lines, which is to be replaced by the pixel replacement unit, is substantially in contact with a position and an end of one of the lines, the position being where the boundary between the predetermined and contiguous image areas intersect the lines.

6. The image processing device according to claim 3, wherein the at least one colored pixel forming part of each of the lines, which is to be replaced by the pixel replacement unit, is substantially in contact with a position and an end of one of the lines, the position being where the boundary between the predetermined and contiguous image areas intersect the lines.

7. The image processing device according to claim 1, wherein the pixel replacement unit replaces the at least one colored pixel forming part of each of the lines in accordance with the first and second directions.

8. The image processing device according to claim 2, wherein the pixel replacement unit replaces the at least one colored pixel forming part of each of the lines in accordance with the first and second directions.

9. The image processing device according to claim 3, wherein the pixel replacement unit replaces the at least one colored pixel forming part of each of the lines in accordance with the first and second directions.

10. The image processing device according to claim 1, wherein the pixel replacement unit replaces the at least one colored pixel forming part of each of the lines in correspondence with the one or more gradations forming the image and expressed by the image information set.

11. The image processing device according to one of claim 2, wherein the pixel replacement unit replaces the at least one colored pixel forming part of each of the lines in correspondence with the one or more gradations forming the image and expressed by the image information set.

12. The image processing device according to one of claim 3, wherein the pixel replacement unit replaces the at least one colored pixel forming part of each of the lines in correspondence with the one or more gradations forming the image and expressed by the image information set.

13. The image processing device according to claim 10, wherein the pixel replacement unit replaces the at least one colored pixel forming part of each of the lines if the one or more gradations forming the image and expressed by the image information set exceed a first threshold.

14. The image processing device according to claim 11, wherein the pixel replacement unit replaces the at least one colored pixel forming part of each of the lines if the one or more gradations forming the image and expressed by the image information set exceed a first threshold.

15. The image processing device according to claim 12, wherein the pixel replacement unit replaces the at least one colored pixel forming part of each of the lines if the one or more gradations forming the image and expressed by the image information set exceed a first threshold.

16. The image processing device according to claim 13, wherein if the one or more gradations forming the image and expressed by the image information set exceed a second threshold higher than the first threshold, the pixel replacement unit replaces more pixels than the replaced at least one colored pixel replaced if the first threshold is exceeded.

17. The image processing device according to claim 14, wherein if the one or more gradations forming the image and expressed by the image information set exceed a second threshold higher than the first threshold, the pixel replacement unit replaces more pixels than the replaced at least one colored pixel replaced if the first threshold is exceeded.

18. The image processing device according to claim 15, wherein if the one or more gradations forming the image and expressed by the image information set exceed a second threshold higher than the first threshold, the pixel replacement unit replaces more pixels than the replaced at least one colored pixel replaced if the first threshold is exceeded.

19. The image processing device according to claim 16, wherein the first threshold falls within a range of about 30 to about 40% where the one or more gradations are expressed in percentages, and the second threshold falls within a range of about 40 to about 50% where the one or more gradations are expressed in percentages.

20. The image processing device according to claim 17, wherein the first threshold falls within a range of about 30 to about 40% where the one or more gradations are expressed in percentages, and the second threshold falls within a range of about 40 to about 50% where the one or more gradations are expressed in percentages.

21. The image processing device according to claim 18, wherein the first threshold falls within a range of about 30 to about 40% where the one or more gradations are expressed in percentages, and the second threshold falls within a range of about 40 to about 50% where the one or more gradations are expressed in percentages.

22. The image processing device according to claim 13, wherein if the one or more gradations forming the image and expressed by the image information set exceed a third threshold higher than the second threshold, the pixel replacement unit replaces less pixels than the at least one colored pixel replaced if the first threshold is exceeded.

23. The image processing device according to claim 14, wherein if the one or more gradations forming the image and expressed by the image information set exceed a third threshold higher than the second threshold, the pixel replacement unit replaces less pixels than the at least one colored pixel replaced if the first threshold is exceeded.

24. The image processing device according to claim 15, wherein if the one or more gradations forming the image and expressed by the image information set exceed a third threshold higher than the second threshold, the pixel replacement unit replaces less pixels than the at least one colored pixel replaced if the first threshold is exceeded.

25. The image processing device according to claim 22, wherein
the first threshold falls within a range of about 30 to about 40% where the one or more gradations are expressed in percentages, and
the third threshold falls within a range of about 60 to about 70% where the one or more gradations are expressed in percentages.

26. The image processing device according to claim 23, wherein
the first threshold falls within a range of about 30 to about 40% where the one or more gradations are expressed in percentages, and
the third threshold falls within a range of about 60 to about 70% where the one or more gradations are expressed in percentages.

27. The image processing device according to claim 24, wherein
the first threshold falls within a range of about 30 to about 40% where the one or more gradations are expressed in percentages, and
the third threshold falls within a range of about 60 to about 70% where the one or more gradations are expressed in percentages.

28. An image forming device comprising;
a detection unit that detects positional dislocation of a pixel;
a receiving unit that receives a multi-value image information set;
a processing unit that converts into a binary image information set the multi-value image information set received by the receiving unit, the binary image information set forming a plurality of lines each constituted of colored pixels arrayed in a first direction, and the binary image information set expressing one or more gradations forming an image each as a number of the predetermined pixels existing in a predetermined image area;
a correction unit that corrects the binary image information set, according to a detection result from the detection unit;
an image area shift unit that divides into a plurality of image areas the binary image information set corrected by the correction unit, and shifts positions of the plurality of image areas along a main scanning direction or a sub scanning direction;
a pixel replacement unit that replaces at least one colored pixel forming part of each of the lines and existing within a predetermined distance range from the boundary, with at least one colored pixel intervening between the lines, if each interval between the lines on a boundary between substantially contiguous image areas among the plurality of image areas in the image in which the positions of the plurality of image areas have been shifted is narrower than each interval between the lines in the image areas, or the pixel replacement unit replaces the at least one colored pixel intervening between the lines and existing within a predetermined distance range from the boundary, with the at least one colored pixel forming part of the lines, if each interval between the lines on a boundary between substantially contiguous image areas among the plurality of image areas in the image in which the positions of the plurality of image areas have been shifted is wider than each interval between the lines in the image areas; and
an image forming unit that forms an image on a recording material, according to the image information set containing pixels replaced by the pixel replacement unit.

29. A non-transitory computer readable medium storing a program causing a computer having a processor to execute a process for image processing, the process comprising:
dividing, by the processor, an image information set into a plurality of image areas, the image information set forming a plurality of lines each constituted of predetermined pixels arrayed in a first direction, and the image information set expressing one or more gradations of an image each as a number of the predetermined pixels existing in a predetermined image area;
shifting, by the processor, the predetermined image area among the plurality of image areas in a second direction different from the first direction, relative to an image area contiguous to the predetermined image area; and
replacing, by the processor, at least one colored pixel forming part of each of the lines and existing within a predetermined distance range from the boundary, with at least one colored pixel intervening between the lines, if each interval between the lines on a boundary between the predetermined image area and the substantially contiguous image area in the image after shifting the predetermined image area is narrower than each interval between the lines on a boundary between the predetermined image area and the substantially contiguous image area in the image before shifting the predetermined image area.

30. A non-transitory computer readable medium storing a program causing a computer having a processor to execute a process for image processing, the process comprising:
dividing, by the processor, an image information set into a plurality of image areas, the image information set forming a plurality of lines each constituted of predetermined pixels arrayed in a first direction, and the image information set expressing one or more gradations of an image as a number of pixels constituting the lines;
shifting, by the processor, the predetermined image area among the plurality of image areas in a second direction different from the first direction, relative to an image area substantially contiguous to the predetermined image; and
replacing, by the processor, at least one colored pixel intervening between the lines and existing within a predetermined distance range from the boundary, with at least one colored pixel forming part of the lines between the lines, if each interval between the lines on a boundary between the predetermined image area and the substantially contiguous image area in the image after shifting the predetermined image area is wider than each interval between the lines on a boundary between the predetermined image area and the substantially contiguous image area in the image before shifting the predetermined image area.

31. An image processing method in a computer having a processor, the method comprising:
areas, the image information set forming a plurality of lines each constituted of predetermined pixels arrayed in a first direction, and the image information set expressing one or more gradations of an image each as a number of the predetermined pixels existing in a predetermined image area;
shifting, by the processor, the predetermined image area among the plurality of image areas in a second direction different from the first direction, relative to an image area substantially contiguous to the predetermined image area; and replacing, by the processor, at least one colored pixel forming part of each of the lines and existing within a predetermined distance range from the boundary, with at least one colored pixel intervening between the lines, if each interval between the lines on a boundary between the predetermined image area and the substantially contiguous image area in the image after shifting the predetermined image area is narrower than each interval between the lines on a boundary between the predetermined image area and the substantially contiguous image area in the image before shifting the predetermined image area.

32. An image processing method in a computer having a processor, the method comprising:

dividing, by the processor, an image information set into a plurality of image areas, the image information set forming a plurality of lines each constituted of predetermined pixels arrayed in a first direction, and the image information set expressing one or more gradations of an image as a number of pixels constituting the lines;

shifting, by the processor, the predetermined image area among the plurality of image areas in a second direction different from the first direction, relative to an image area substantially contiguous to the predetermined image; and replacing, by the processor, at least one colored pixel intervening between the lines and existing within a predetermined distance range from the boundary, with at least one colored pixel forming part of the lines between the lines, if each interval between the lines on a boundary between the predetermined image area and the substantially contiguous image area in the image after shifting the predetermined image area is wider than each interval between the lines on a boundary between the predetermined image area and the substantially contiguous image area in the image before shifting the predetermined image area.

* * * * *